Figure 1:
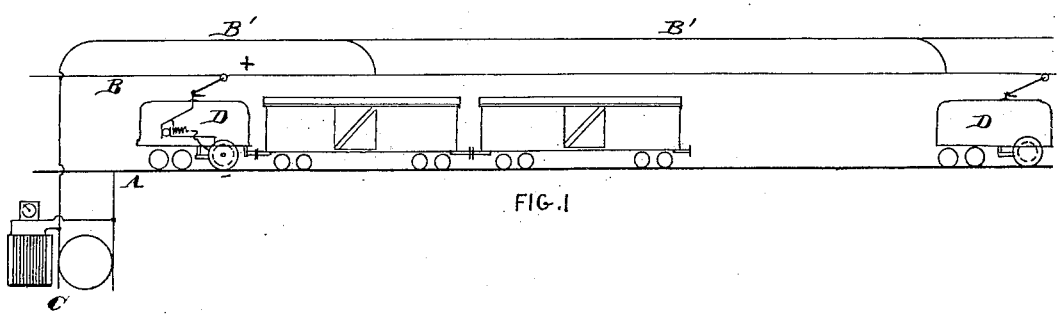

No. 641,452. Patented Jan. 16, 1900.
R. M. HUNTER.
MEANS FOR CONTROLLING ELECTRIC MOTORS.
(Application filed Jan. 16, 1894.)

(No Model.)

Attest
H. L. Motherwell
Wm. L. Evans

Inventor
R. M. Hunter

UNITED STATES PATENT OFFICE.

RUDOLPH M. HUNTER, OF PHILADELPHIA, PENNSYLVANIA.

MEANS FOR CONTROLLING ELECTRIC MOTORS.

SPECIFICATION forming part of Letters Patent No. 641,452, dated January 16, 1900.

Application filed January 16, 1894. Serial No. 497,024. (No model.)

*To all whom it may concern:*

Be it known that I, RUDOLPH M. HUNTER, of the city and county of Philadelphia, in the State of Pennsylvania, have invented an Improvement in Means and Methods for Controlling Electric Motors, of which the following is a specification.

My invention has reference to means for controlling electric motors; and it consists of certain improvements which are fully set forth in the following specification and shown in the accompanying drawings, which form a part thereof.

This application (Case No. 269) comprehends certain improvements in means for regulating the speed and power of electric motors without the employment of resistance-rheostats.

My improvements are especially adapted to electric traction where the duty put upon the motor is most varied and severe. In cases where two motors have been employed to propel the same car I have found it convenient and excellent in practice to couple the said motors in series or parallel to vary the counter electromotive force of the said motors, and thereby regulate the same when working upon a constant-potential circuit. That system is more or less impracticable where a single motor is employed, for obvious reasons, and my present improvement is to provide a means also operating to oppose to the initial electromotive force by a counter electromotive force to control the flow of current through the motor or motors, and thereby vary the speed and power of the said motor or motors to a far greater nicety.

My invention is peculiarly applicable to a case where a single large motor is to be regulated, but may also be used where two or more motors are employed; but in that case the said several motors would preferably be connected permanently in series or multiple.

In carrying out my invention I provide the electrically-propelled vehicle with a small regulator-motor, having no work to perform, and so constructed that an exceedingly-high velocity is possible. The armature of the said regulator-motor I connect in series with the large motor or motors, so that the current from the source of electrical energy is first caused to pass through the armature of the regulator and then through the power motor or motors, whereby whatever current passes through the power-motors is required to pass through the armature of the regulator. The armature of the regulator revolves freely within a field, preferably of fixed intensity, so that the regulator generates a counter electromotive force which is opposed to the initial electromotive force of the line. To regulate the power motor or motors, the speed of the regulator-armature is varied, being increased or decreased by a suitable hand-controller. I have found in practice with this system that the large series power-motor could be readily brought to rest or may run at any desired speed by the simplest adjustment of the speed of the regulating-armature. I have employed breaking devices to control the said speed and also adjustment by means of the brushes, causing their position upon the commutator relatively to the field-poles to be shifted. This latter method is perhaps the simplest and best in actual practice.

My invention will be better understood by reference to the accompanying drawings, in which—

Figure 2:
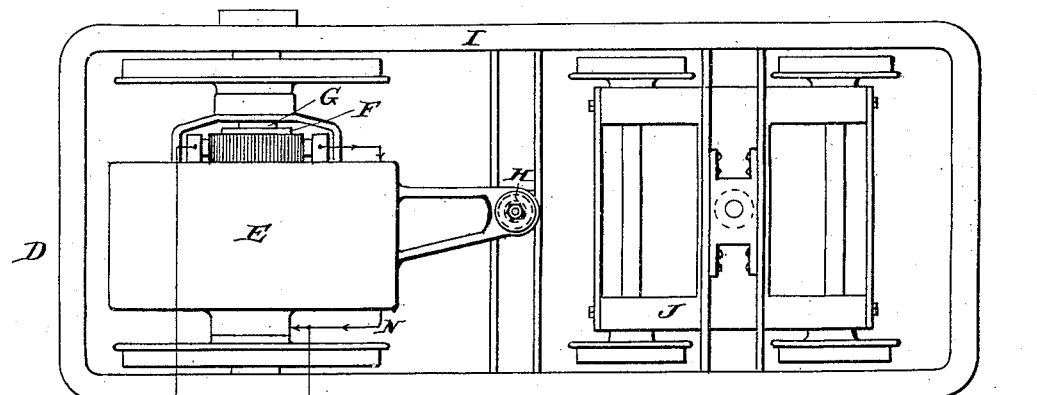
Figure 4:
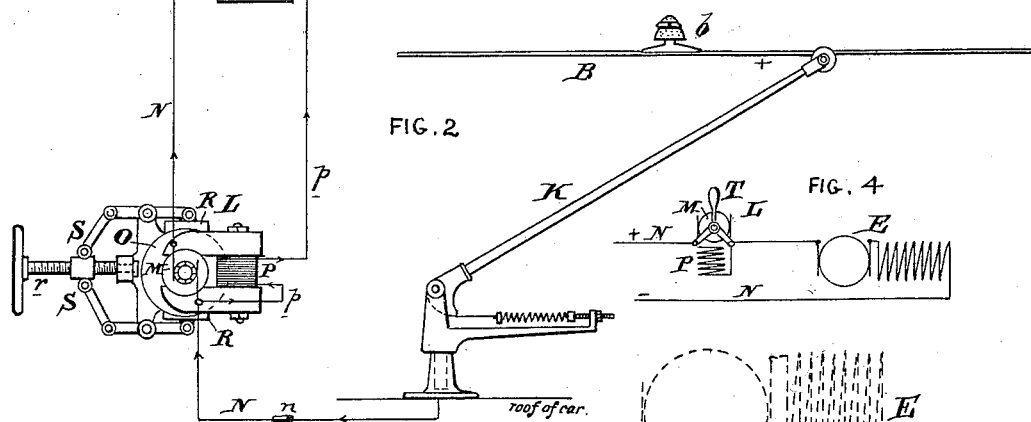
Figure 3:
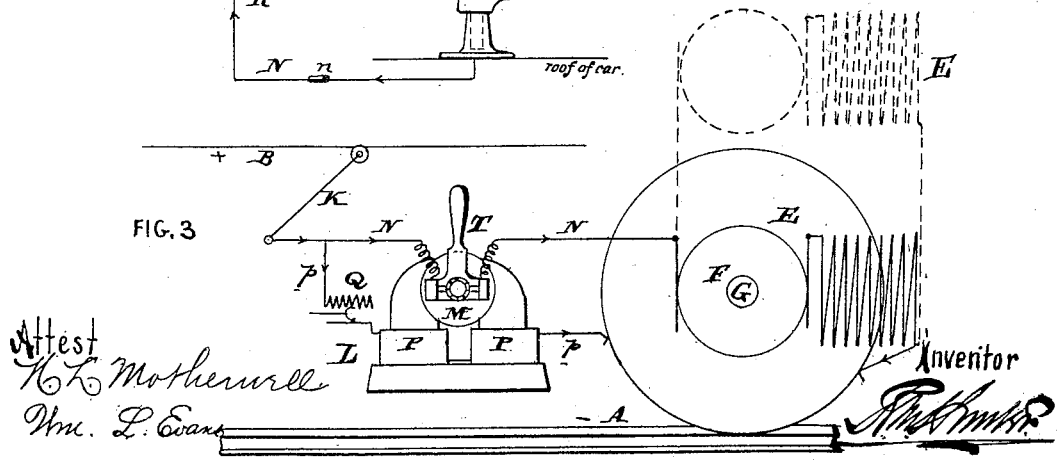

Figure 1 is a side elevation illustrating diagrammatically an electric railway embodying my invention. Fig. 2 is a plan diagrammatic view showing the relative connections of the various parts of my improvements. Fig. 3 is an elevation of another form of my apparatus, and Fig. 4 is a diagram illustrating a modification of the construction shown in Fig. 3.

A are the rails and may act as the return-conductors. B is the outgoing or positive conductor, and B' is the feeding conductors or wires leading to the positive conductor B at different distances from the generating-station. C is a constant-potential generator having a regulator *c* to control the field. This system of circuits will deliver constant-potential currents to the line. The conductor B may be a suspended conductor carried by insulators *b*, as is customary in trolley systems.

D is an electric locomotive or car. This vehicle is provided with a frame I, which may have at one end a pivoted truck J and a rear axle G, directly driven by an armature F of a large series motor E, which is journaled upon or concentric with the axle G and supported by the frame I at H in any convenient manner.

I do not confine myself to any particular construction of vehicle or method of connecting the motor or motors thereon with the axle or axles, as my invention is applicable to any of the constructions heretofore employed. The vehicle is provided with a current-collecting device K, which is shown as an ordinary trolley preferably arranged upon the roof of the car and making an underrunning contact with the suspended conductor B. A large number of cars would ordinarily be employed in parallel on the line.

N is the motor-circuit, leading from the trolley to the motor or motors E and then connecting with the wheels, so that the current returns by the rails A to the generator C.

L is the regulator-motor and consists of a small armature M, having a winding capable of carrying the current required for the motor or motors E and connected in the motor-circuit N in series with the motor or motors E. This armature M is perfectly free to revolve, as it performs no work except as a generator of counter electromotive force. It revolves in a field produced by the field-magnets P, which are preferably arranged in a shunt-circuit $p$ about the motor or motors E and the armature M of the regulator, so that the field remains substantially constant. The armature-shaft M may be provided with a brake-wheel O, upon which brake-shoes R may be pressed by toggles S and a hand-screw $r$ to vary or control speed of rotation of the armature M. If the brake-shoes are removed, the speed of the motor M increases until its counter electromotive force equals the initial electromotive force of the line, and the regulator-motor is working at its greatest efficiency. If the hand-screw R is operated to lower the speed of the armature M, a current is instantly permitted to flow through the motor-circuit N and motor or motors E, and this may be increased as desired, allowing the motor or motors E to gradually accelerate its or their speed. The reverse operation may be performed in stopping the motor or motors E.

A suitable cut-out switch may be inserted in the motor-circuit on the car for permanently or for a longer or shorter period interrupting the circuit and would be used when the car is absolutely kept at rest. Such a switch is shown at $n$ in the motor-circuit N on Fig. 2. Ordinarily it would be interposed between the trolley K and regulating counter-electromotive-force generator L.

The counter electromotive force of the regulator-armature M and the motor E permit the most perfect and gradual regulation without endangering the armatures of either the motor E or regulator L by too long simultaneous inaction. By the proper construction of the regulator L but a very low resistance is required in the armature M, and hence this regulator may be made exceedingly small.

In the construction shown in Fig. 3 we have the same general construction as in Fig. 2; but in this case there is no brake to vary the speed of the armature, but instead the brushes of the armature are controlled by a hand-lever T, which upon being moved will control to an absolute nicety the counter electromotive force in the regulator-motor, causing the armature E of the regulator to vary its speed from a state of rest to maximum and to permit the changes to be made with the most gradual accuracy. In this figure I have shown a second motor E (indicated in dotted lines) in parallel with the regulating-armature M. This is the preferred arrangement when two motors E are employed, though it is also evident that such motors E may be maintained permanently in series with each other if their resistance is not too great.

I have shown a resistance Q in the shunt-circuit $p$ of the field-magnets P; but this need not necessarily be employed, as the field-magnets should be of sufficiently high resistance to permit them being permanently connected with the line-circuit. I have not shown in the drawings the usual reversing-switches employed with the power-motors E, as they may be employed in the manner customary with all series electric motors requiring the current to be reversed in either the armature or field.

In Fig. 4 we have the same construction as that of Fig. 3, except that the field-coil of the controller L is in shunt about the regulator-armature M, but in series with the power-motor E. It is also evident that in place of shifting the brushes by handle T the speed of this motor may be regulated by the brake shown in Fig. 2, or, if desired, the field-coil P of the regulator-motor L of Fig. 2 may be put in the relation shown in Fig. 4.

I do not limit myself to any particular construction of regulating-motor L, as it may be constructed in any manner desired. It is evident that the field may be produced by permanent magnets, though this is not desirable. It is also evident that the regulating-motor may be a series motor in place of a shunt-motor; but I do not claim this specific construction in this application, as that will form subject-matter of another application. My invention comprehends, broadly, the regulation of one or more motors by means of a counter-electromotive-force generator having conductors moving within a field and in which the speed of the moving conductor is varied by means of hand operated or controlled devices to vary the counter electromotive force in the regulating-motor.

Any of the sources of electricity heretofore well known may be used to supply electricity to the motors—such, for example, as storage batteries, as well as dynamos—as, broadly considered, the particular source of energy is immaterial.

In this application I do not claim this method of controlling motors by counter-electromotive-force system of regulation, as the method forms the subject-matter of a divisional application, Serial No. 736,304, filed November 9, 1899.

What I claim as new, and desire to secure by Letters Patent, is—

1. The combination of one or more electric-power motors receiving current from a source of electrical energy of maximum potential, with a counter-electromotive-force regulator consisting of electric conductors independent of and in series with the armature of the motor or motors and moving in a magnetic field independent of that of the power motor or motors, and provided with means to positively vary the speed of movement of said conductors independently of and in advance of changes of speed of the motor or motors and circuits for maintaining the counter-electromotive-force regulator in series connection with the power-motors while the latter are performing their normal duty.

2. The combination of one or more electric motors receiving current from a source of electrical energy of maximum potential, with a counter-electromotive-force regulator consisting of electric conductors maintained in series with the motor or motors while performing their normal duty and moving in a magnetic field, and provided with means to increase or decrease the speed of movement of the conductors in advance of the required changes of speed of the motor or motors both in increasing and decreasing consisting of hand operated or controlled devices for producing a difference in speed of the moving electrical conductors to vary the supply of current to the motor without changing the potential of the source of energy or interfering with the normal running duty of the power-motors.

3. The combination of one or more series electric motors receiving current from a source of electrical energy of constant potential, with a counter-electromotive-force regulator consisting of electric conductors maintained in series with the armature and field coils of the motor or motors while the same are performing their normal duty and moving in a magnetic field, and provided with means to positively increase or decrease the speed of movement of said conductors independently of and in advance of changes of speed of the motor or motors but while the motors are performing their normal duty whereby their speeds may be increased or decreased at will without stopping.

4. The combination of one or more electric motors receiving current from a source of electrical energy of maximum potential, with a counter-electromotive-force regulator consisting of electric conductors in series with the motor or motors and moving in a constant magnetic field, and provided with means to vary the speed of movement of said conductors consisting of hand operated or controlled devices for producing a difference in speed of the moving electrical conductors to vary the supply of current to the motor without changing the potential of the source of energy.

5. The combination of one or more electric motors receiving current from a source of electrical energy of maximum potential, with a counter-electromotive-force regulator consisting of electric conductors in series with the motor or motors and moving in a magnetic field, provided with movable brushes to vary the speed of movement of the conductors, and hand operated or controlled devices for shifting the brushes into different positions relatively to the field-poles to change the counter electromotive force of the regulator in advance of the changes of speed in the motor and independent of the maximum potential of the source of energy.

6. The combination of one or more electric motors receiving current from a source of electrical energy of maximum potential, with a counter-electromotive-force regulator independent of the motor or motors and consisting of electric conductors in series with the entire motor or motors and moving in an electromagnetic field produced independently of the winding of the motor, means to vary the speed of movement of the conductors, and field-magnet coils of high resistance in shunt relation to the entire motor or motors and moving conductors to maintain a constant field in the regulator and supplied with current independently of the current traversing the motor or motors and regulating moving conductors.

7. The combination of one or more electric motors receiving current from a source of electrical energy, with a counter-electromotive-force regulator consisting of electric conductors in series, with the motor or motors and moving in a magnetic field, means to vary the speed of movement of the conductors, field-magnet coils of high resistance in a shunt-circuit about the motor or motors and moving conductors to maintain a constant field in the regulator and supplied with current independently of the current traversing the motor or motors and moving conductors of the regulator, and hand-operated devices for varying at will the counter electromotive force of the regulator.

8. The combination of one or more electric motors receiving current from a source of electrical energy of constant potential, with a counter-electromotive-force regulator maintained in electrical connection with said motors during the normal performance of their work and consisting of electric motors permanently coupled in series with said motors and said conductors moving in a magnetic field, and hand-operated means to vary at will during the normal operation of the motors while performing their work the speed of movement of the conductors to vary the total current flowing through the motor or motors by increasing or decreasing the counter electromotive force exterior to said motor or motors while performing their normal duty and inversely to the counter electromotive force desired in the motors in their coupled condition with the counter-electromotive-force regulator.

9. In an electric railway, the combination of a positive conductor and a return or negative conductor, a constant-potential generator supplying current to said conductors, two or more electrically-propelled vehicles receiving current from said conductors and working in parallel, and in which each of said electrically-propelled vehicles is provided with an electric motor to rotate the axle capable of generating a variable counter electromotive force between wide limits from nothing to that approaching the electromotive force of the generator, and a counter-electromotive-force regulator consisting of electric conductors in series with the motor and revolving within a magnetic field and provided with means to vary the speed of movement of its conductors to vary the counter electromotive force of the regulator in advance of the desired changes in speed of the power-motor.

10. In an electric railway, the combination of a positive conductor and a return or negative conductor, a constant-potential generator supplying current to said conductors, two or more electrically-propelled vehicles receiving current from said conductors and working in parallel, and in which each of said electrically-propelled vehicles is provided with an electric motor to rotate the axle, and a counter-electromotive-force regulator consisting of electric conductors in series with the motor and revolving within a magnetic field and provided with means to vary the speed of movement of the conductors consisting of hand operated or controlled devices to vary the position of the poles produced by the revolving electric conductors within the field to vary the counter electromotive force of the regulator in advance of the desired changes of speed in the power-motor.

11. In an electric railway, the combination of a positive conductor and a return or negative conductor, a constant-potential generator supplying current to said conductors, two or more electrically-propelled vehicles receiving current from said conductors and working in parallel, and in which each of said electrically-propelled vehicles is provided with an electric motor to rotate the axle, and a counter-electromotive-force regulator consisting of electric conductors in series with the motor and revolving within a magnetic field and provided with means to vary the speed of movement of the conductors to vary the counter electromotive force of the regulator in advance of the desired changes in speed of the power-motors, and means for maintaining a substantially constant field consisting of a shunt-circuit about the moving conductors and receiving current only from the constant-potential generator.

12. In an electric railway, the combination of a positive conductor, a return-conductor, a generator of constant potential having one pole connected with the return-conductor, feeding-conductors connecting the other pole of the generator at distant places with the positive conductor, an electrically-propelled vehicle, a series electric motor to operate the vehicle, a counter-electromotive-force regulator to control the operation of the electric motor consisting of a revolving armature operating within a magnetic field and in series with the propelling-motor, and hand-controlled devices for varying the speed of the counter-electromotive-force-regulating armature in advance of the changes of speed in the power-motor.

13. In an electric railway, the combination of a positive conductor, a return-conductor, a generator of constant potential having one pole connected with the return-conductor, feeding-conductors connecting the other pole of the generator at distant places with the positive conductor, an electrically-propelled vehicle, a series electric motor to operate the vehicle, a counter-electromotive-force regulator to control the operation of the electric motor consisting of a revolving armature operating within a magnetic field and in series with the propelling-motor, and means for varying the speed of the counter-electromotive-force-regulating armature in advance of the changes of speed in the motor consisting of hand operated or controlled parts to shift the brushes and vary the position of the poles of the revolving armature.

14. The combination of one or more electric motors receiving current from a source of electrical energy, with a counter-electromotive-force regulator consisting of electric conductors independent of and electrically connected in series with the armature of the motor or motors while performing their normal duty and moving in a magnetic field having coils independent of that of the motor or motors, and provided with means to positively vary the speed of movement of said conductors independently of and in advance of changes of speed of the motor or motors while they are performing their normal work.

15. The combination of a high-speed motor, a low-speed motor capable of producing a variable counter electromotive force, electric circuits connecting the armatures of the two motors in series with a source of electric energy of maximum potential, and mechanical devices for shifting the magnetic poles of the armature of the high-speed motor relatively to the field-poles thereof to vary the counter electromotive force of the high-speed motor inversely to the counter electromotive force of the low-speed motor for the purpose of controlling the current delivered to the low-speed motor.

16. The combination of two motors having their revolving elements electrically connected in series, means to maintain a substantially constant magnetic field in the vicinity of the revolving element of one of the motors irrespective of the counter electromotive force of its revolving element, and means for shifting the poles of said revolving element relatively to the poles of the magnetic field in said last-mentioned motor whereby its counter electromotive force is varied and opposed to the initial electromotive force of the operating-current of electricity to vary the speed of the other or power motor.

17. The combination of a power-motor, a regulating-motor, electric circuits leading from a source of maximum potential connecting the revolving elements of the two motors in series with the source of electrical energy, electromagnetic devices for maintaining a magnetic field in the vicinity of the revolving element of the regulating-motor, and mechanical devices for shifting the poles of the revolving element of the regulating-motor, whereby its counter electromotive force is varied inversely to and in advance of the changes in speed and counter electromotive force of the power-motor required and opposed to the initial electromotive force of the operating-current of electricity to vary the speed of the power-motor.

18. The combination of a circuit of constant potential, a power-motor receiving current therefrom, a regulating-motor having its revolving electromagnetic element connected in series with the power-motor as an entirety while performing its normal duty, and hand-controlled means to positively decrease or increase the speed of rotation of the revolving electromagnetic element of the regulating-motor to vary the counter electromotive force thereof while the power-motor is performing its maximum duty said decrease or increase taking place independently of and in advance of the changes required in the speed of the power-motor for the purpose of controlling the current delivered to the power-motor and regulating its speed as required in and during the performance of its normal duty independent of the current in the circuit of constant potential.

19. The combination with an electric motor of a second motor having its armature in circuit with the field-magnets and armature of the first-mentioned motor, a circuit for supplying current to the first-mentioned motor through the second motor, and means for varying the load of the second motor whereby the current supplied to the first motor may be varied.

In testimony of which invention I have hereunto set my hand.

RUDOLPH M. HUNTER.

Witnesses:
ERNEST HOWARD HUNTER,
HELEN L. MOTHERWELL.